US008849540B2

(12) United States Patent
 Nagashima

(10) Patent No.: US 8,849,540 B2
(45) Date of Patent: Sep. 30, 2014

(54) METHODS AND SYSTEMS FOR MONITORING ENGINE COOLANT TEMPERATURE SENSOR

(75) Inventor: Dan Nagashima, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 13/287,388

(22) Filed: Nov. 2, 2011

(65) Prior Publication Data

US 2013/0110373 A1 May 2, 2013

(51) Int. Cl.
  *G01M 15/02* (2006.01)
  *G01M 15/04* (2006.01)
(52) U.S. Cl.
  CPC ................................. *G01M 15/042* (2013.01)
  USPC .......................................................... 701/99
(58) Field of Classification Search
  USPC ..................... 701/114, 34; 374/1, 145; 60/285
  See application file for complete search history.

(56) References Cited

U.S. PATENT DOCUMENTS

| 4,982,709 | A |   | 1/1991  | Oota |
| 5,056,490 | A |   | 10/1991 | Kashima |
| 5,220,895 | A |   | 6/1993  | Curran et al. |
| 5,884,243 | A | * | 3/1999  | Taniguchi et al. ............ 702/183 |
| 5,897,597 | A |   | 4/1999  | O'Daniel |
| 6,128,948 | A | * | 10/2000 | Shi et al. ..................... 73/114.68 |
| 6,200,021 | B1| * | 3/2001  | Mitsutani et al. .................. 374/1 |
| 6,283,381 | B1|   | 9/2001  | Uchiyama |
| 6,736,121 | B2|   | 5/2004  | Gopichandra |
| 6,907,343 | B2| * | 6/2005  | Tsukamoto et al. .......... 701/114 |
| 7,047,932 | B2| * | 5/2006  | Surnilla et al. ............. 123/198 F |
| 7,363,804 | B2|   | 4/2008  | Wakahara et al. |
| 7,524,106 | B2| * | 4/2009  | Higashiyama et al. ........ 374/145 |
| 7,647,766 | B2|   | 1/2010  | Surnilla et al. |
| 8,093,537 | B2| * | 1/2012  | Linn et al. ...................... 219/700 |
| 2004/0206072 | A1| * | 10/2004 | Surnilla et al. ................... 60/285 |
| 2006/0196451 | A1|   | 9/2006  | Braun et al. |
| 2009/0206072 | A1| * | 8/2009  | Linn et al. ...................... 219/700 |
| 2012/0245830 | A1|   | 9/2012  | Eser et al. |

FOREIGN PATENT DOCUMENTS

| KR | 2002055088    | * | 7/2002 |
| KR | 1020040038007 |   | 5/2004 |
| WO | 2011069865    |   | 6/2011 |

OTHER PUBLICATIONS

Stic search results dated Jul. 24, 2013.*
International Search Report and Written Opinion mailed Feb. 26, 2013 in International Application No. PCT/US2012/062132.
International Preliminary Report on Patentability dated May 15, 2014 in PCT/US2012/062132.

* cited by examiner

*Primary Examiner* — John R Olszewski
*Assistant Examiner* — Jean-Paul Cass
(74) *Attorney, Agent, or Firm* — Plumsea Law Group, LLC

(57) ABSTRACT

Methods and systems for monitoring engine coolant temperature sensors are described. In one embodiment, an expected engine coolant temperature may be determined based on the accumulated engine mass air flow. If the current engine coolant temperature is substantially different from the expected temperature, then an error signal may be generated. In one embodiment, the expected engine coolant temperature is compared to the actual engine coolant temperature if the engine coolant temperature has changed by a predetermined amount. In one embodiment, the expected engine coolant temperature is compared to the actual engine coolant temperature if the accumulated engine mass air flow is equal to or is greater than a predetermined value.

20 Claims, 10 Drawing Sheets

METHODS AND SYSTEMS FOR MONITORING ENGINE COOLANT TEMPERATURE SENSOR

The current embodiments relate to the field of motor vehicles. More specifically, the current embodiments relate to monitoring engine coolant temperature sensors in motor vehicles.

BACKGROUND

Vehicles monitor engine coolant temperature sensors for various purposes. One purpose is to detect a failure of the engine coolant temperature sensor. Generally, gasoline powered vehicles can determine coolant temperature as a function of fuel consumption because a specific quantity of fuel combusted by the engine generates a predictable amount of heat. This heat is then transferred to the coolant, which increases the temperature of the coolant by a known amount. Thus, in order to determine if the engine coolant temperature sensor is operating properly, the signal from an engine coolant temperature sensor can be compared to an expected engine coolant temperature corresponding to a known amount of gasoline that was used.

However, flex fuel vehicles may use ethanol and/or other types of fuel in addition to gasoline. Different types of fuels generate different amounts of heat compared to gasoline. Therefore, it may be difficult to monitor the engine coolant temperature sensor in flex fuel vehicles based on fuel consumption.

SUMMARY

Embodiments for systems and methods for monitoring an engine coolant temperature sensor in motor vehicles are provided. One method of monitoring an engine coolant temperature sensor of a motor vehicle may include receiving a signal from a sensor associated with an engine utilizing mixed fuels. The method may also include the step of determining an accumulated engine mass air flow from the sensor signal. The method may also include the step of determining an expected engine coolant temperature value based on the accumulated mass air flow. The method may also include the step of receiving a current engine coolant temperature signal from an engine coolant temperature sensor. The method may also include the step of generating an error signal if the current engine coolant temperature signal is substantially different from the expected engine coolant temperature value.

Another method of monitoring an engine coolant temperature sensor of a motor vehicle may include receiving a signal from a sensor associated with an engine utilizing mixed fuels. The method may also include the step of determining an accumulated engine mass air flow from the sensor signal. The method may also include the step of determining an expected engine coolant temperature value based on the accumulated mass air flow. The method may also include the step of determining an expected engine coolant temperature value based on the accumulated engine mass air flow. The method may also include the step of operating at least one vehicle system based on the expected engine coolant temperature.

A system for monitoring an engine coolant temperature sensor of a motor vehicle may include an engine that operates using mixed fuels. The system may also include an electronic control unit associated with the engine, wherein an electronic memory is associated with the electronic control unit. The system may also include a first sensor electronically connected to the electronic control unit, wherein the electronic control unit determines the accumulated engine mass air flow of the engine based on the signal sent by the first sensor, wherein the electronic control unit determines an expected engine coolant temperature based on the accumulated engine mass air flow. The system may also include an engine coolant temperature sensor electronically connected to the electronic control unit, wherein the electronic control unit receives a current engine coolant temperature signal from the engine coolant temperature sensor, wherein the electronic control unit compares the current engine coolant temperature signal to the expected engine coolant temperature, wherein the electronic control unit generates an error signal if the engine coolant temperature sensor signal is substantially different from the expected engine coolant temperature.

Other systems, methods, features and advantages of the embodiments described herein will be, or will become, apparent to one of ordinary skill in the art upon examination of the following figures and detailed description. It is intended that all such additional systems, methods, features and advantages included within this description and this summary, be within the scope of the current embodiments, and be protected by the following claims.

BRIEF DESCRIPTION OF THE DRAWINGS

The current embodiments can be better understood with reference to the following drawings and description. The components in the figures are not necessarily to scale, emphasis instead being placed upon illustrating the principles of the current embodiments. Moreover, in the figures, like reference numerals designate corresponding parts throughout the different views.

DETAILED DESCRIPTION

The term "mixed fuel" as used throughout this detailed description and in the claims applies to a mixture of two or more fuel components. For example, in some cases, a mixed fuel may be a mixture of gasoline and ethanol. Generally, mixtures of gasoline and ethanol can include different proportions of ethanol including, but not limited to: E20, E75, E80 and E85. In other cases, other types of mixed fuels can be used including, but not limited to: methanol and gasoline mixtures, p-series fuels as well as other mixed fuels. In some cases, gasoline without ethanol may be referred to as E0 fuel. Moreover, it will be understood that the term "mixed fuel" as used throughout this detailed description and in the claims is not limited to fuels including alcohols and may comprise any mixture of different known fuel components.

The terms "motor vehicle" and "vehicle," as used throughout the specification and claims, refers to any moving vehicle that is capable of carrying one or more human occupants and is powered by any form of energy. The terms "motor vehicle" and "vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Figure 1:
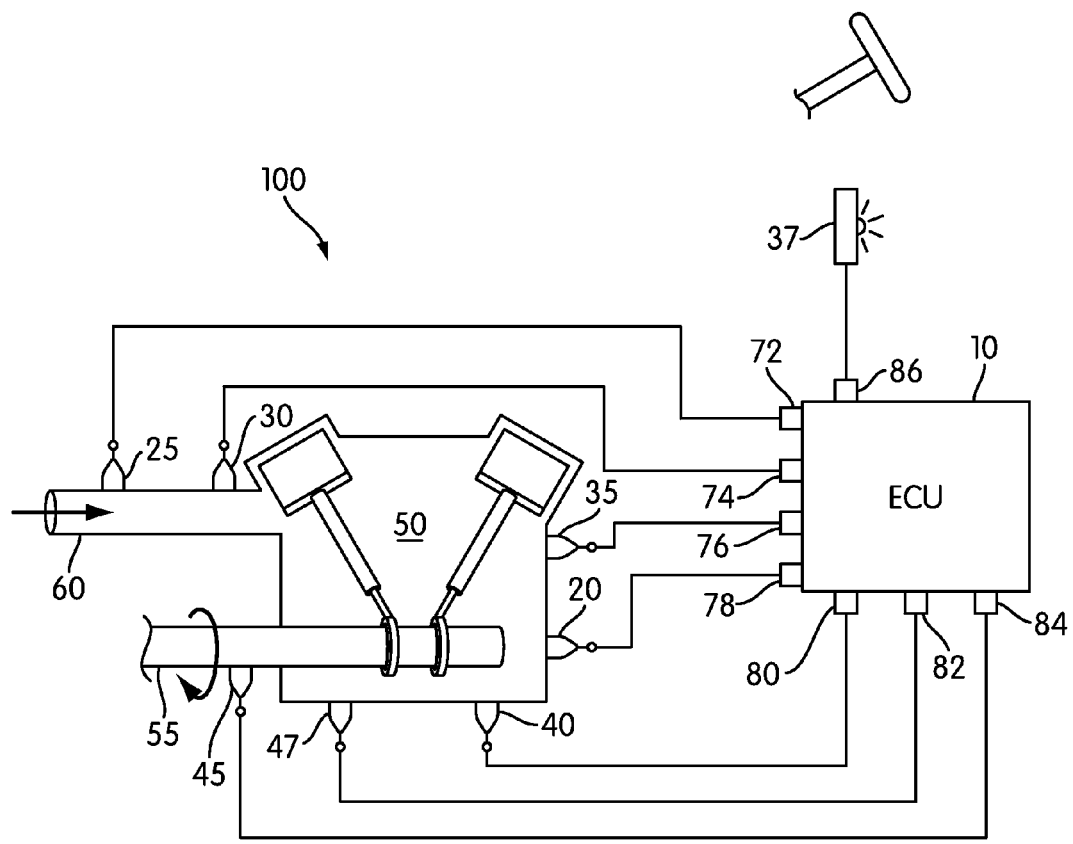
FIG. 1 is a schematic view of various sensors and electrical components of a motor vehicle relevant to certain embodiments.

FIG. 1 is a schematic view of various sensors and electrical components of a motor vehicle 100 according to one embodiment. For purposes of clarity, only some components of motor vehicle 100 are shown in the current embodiment. Furthermore, it will be understood that in other embodiments some of the components may be optional. Additionally, it will be understood that in other embodiments, any other arrangements of the components illustrated here can be used for powering motor vehicle 100.

For purposes of illustration, some components of motor vehicle 100 are shown schematically in this embodiment. In one embodiment, motor vehicle 100 can include an engine 50. For purposes of clarity, only a portion of an engine 50 is shown in the current embodiment. In particular, an engine 50 having an air intake manifold 60 and a crankshaft 55 are shown. It will be understood, however, that in other embodiments, engine 50 could include other components and features not shown in FIG. 1.

Motor vehicle 100 may include provisions for communicating, and in some cases controlling, the various components associated with the motor vehicle 100. In some embodiments, the motor vehicle 100 may be associated with a computer or similar device. In the current embodiment, the motor vehicle 100 may include an electronic control unit 10. In one embodiment, the electronic control unit 10 may be configured to communicate with, and/or control, various components of the motor vehicle 100. In addition, in some embodiments, the electronic control unit 10 may be configured to control additional components that are not shown.

The electronic control unit 10 may include a microprocessor, RAM, ROM, and software all serving to monitor and supervise various parameters of the engine, as well as other components or systems of the motor vehicle 100. For example, the electronic control unit 10 is capable of receiving signals from numerous sensors located in the engine. The output of various sensors is sent to the electronic control unit 10 where the sensor signals may be stored in an electronic storage, such as RAM. Both current and electronically stored sensor signals may be processed by the central processing unit (CPU) in accordance with software stored in an electronic memory, such as ROM.

Motor vehicle 100 can include provisions for monitoring various operating parameters of an engine and/or other systems. For example, the electronic control unit 10 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In some embodiments, motor vehicle 100 can include provisions to collect information. For example, vehicle information can be collected by sensors located throughout the vehicle. Examples of vehicle sensors can include thermometers, atmospheric pressure gauges, air quality monitors, speedometers, tachometers, accelerometers, wheel slippage indicators, oil pressure gauges, and other known vehicle sensors. In some cases, electronic control unit 10 may be configured to receive information from these sensors. Additionally, in some embodiments, external devices may transmit information to electronic control unit 10.

All of the following ports and provisions associated with the electronic control unit 10 are optional. Some embodiments may include a given port or provision, while others may exclude it. The following description discloses many of the possible ports and provisions that can be used. However, it should be kept in mind that not every part or provision must be used or included in a given embodiment.

In some embodiments, the electronic control unit 10 can include provisions for receiving air flow information. In some cases, the electronic control unit 10 may include port 72 for receiving information from an air flow meter 25. In some cases, air flow meter 25 may be associated with a portion of the intake manifold 60 of the engine 50. Although the current embodiment shows air flow meter 25 associated with a portion of the intake manifold 60 of the engine 50, air flow meter 25 may be positioned in other locations throughout the engine. In other embodiments, the electronic control unit 10 can include provisions for receiving information relating to the rate of air flow through the engine by any device or method known in the art.

In some embodiments, the electronic control unit 10 can include provisions for receiving air pressure information. In some cases, the electronic control unit 10 may include port 74 for receiving information from a manifold pressure sensor 30. In some cases, manifold pressure sensor 30 may be associated with a portion of the intake manifold 60 of the engine 50. Although the current embodiment shows manifold pressure sensor 30 associated with a portion of the intake manifold 60 of the engine 50, manifold pressure sensor 30 may be positioned in other locations throughout the engine. In other embodiments, the electronic control unit 10 can include provisions for receiving information relating to the pressure of the intake manifold 60 by any device or method known in the art.

In some embodiments, the electronic control unit 10 can include provisions for receiving engine speed information. In some cases, the electronic control unit 10 may include port 76 for receiving information from an engine speed sensor 35. In some cases, engine speed sensor 35 may be associated with a portion of the engine 50. Although the current embodiment shows engine speed sensor 35 associated with a portion of the engine 50, engine speed sensor 35 may be positioned in other locations throughout the vehicle 100. In some embodiments, the engine speed sensor 35 may be associated with a portion of the crankshaft 55. In other embodiments, the electronic control unit 10 can include provisions for receiving information relating to the speed of the engine by any device or method known in the art.

In some embodiments, the electronic control unit 10 can include provisions for receiving engine coolant water temperature information. In some cases, the electronic control unit 10 may include port 80 for receiving information from an engine coolant water temperature sensor 40. In some cases, manifold engine coolant water temperature sensor 40 may be associated with a portion of engine 50. Although the current embodiment shows engine coolant water temperature sensor 40 associated with a portion of engine 50, engine coolant water temperature sensor 40 may be positioned in other locations throughout the engine 50. In other embodiments, the electronic control unit 10 can include provisions for receiving information relating to the engine coolant water temperature by any device or method known in the art.

In some embodiments, the electronic control unit 10 can include provisions for receiving information relating to the rate that the crankshaft is spinning. In some cases, the electronic control unit 10 may include port 84 for receiving information from crankshaft position sensor 45. In some cases, crankshaft position sensor 45 may be associated with a portion of the crankshaft 55 of engine 50. Although the current embodiment shows crankshaft position sensor 45 associated with a portion of crankshaft 55, crankshaft position sensor 45 may be positioned in other locations throughout the vehicle 100. In some embodiments, crankshaft position sensor 45 may be associated with a portion of the distributor (not shown in FIG. 1), effectively driven by the timing belt (also not shown in FIG. 1). In other embodiments, electronic control unit 10 can include provisions for receiving information relating to the rate of spin of the crankshaft by any device or method known in the art.

In some embodiments, the electronic control unit 10 may include provisions for receiving engine oil temperature information. In some cases, electronic control unit 10 may include port 78 for receiving information relating to the temperature of the engine oil from an engine oil temperature sensor 20. In some cases, engine oil temperature sensor 20 may be associated with a portion of the engine 50. Although the current embodiment shows the engine oil temperature sensor 20 associated with a portion of engine 50, the engine oil temperature sensor 20 may be located throughout any portion of the vehicle 100 so as to accurately provide the engine oil temperature information for the electronic control unit 10.

In some embodiments, the electronic control unit 10 may include provisions for alerting a user about a failure of the engine coolant temperature sensor. In some embodiments, the electronic control unit 10 may include port 86 for transmitting an electronic signal to a malfunction indicator 37 mounted on the dashboard of vehicle 100. In some cases, malfunction indicator 37 may be associated with a portion of the dashboard. Although the current embodiment shows the malfunction indicator 37 associated with a portion of the dashboard, the malfunction indicator 37 may also be associated with any other location that is visible or audible to the operator.

In one embodiment, malfunction indicator 37 may be a lamp or other type of visual indicator. The term "malfunction indicator" as used throughout this detailed description and in the claims refers to any visual, audible and/or tactile indicator that may be used to alert a user about a potential issue associated with an engine coolant temperature sensor. In some embodiments, the malfunction indicator 37 may be an engine symbol which is lit up when activated. In other embodiments, the malfunction indicator 37 may read "trouble," "engine," "check engine," "service engine soon," "check engine soon," or some other verbal warning. In some embodiments, the light behind the symbol may blink on and off. In other embodiments, the light behind the symbol will be steady. Other embodiments may include various stages, such as steady and/or flashing lights. In some embodiments, the electronic control unit 10 records the condition which caused the malfunction indicator 37 to activate. In some embodiments, the operator can access the electronic control unit 10 to determine what caused the malfunction indicator 37 to activate. In other embodiments, the operator must bring the vehicle to a service facility that has the proper equipment to determine what caused the indicator 37 to activate. In some embodiments the malfunction indicator 37 may stay lit once it is activated, and must be brought to a service station in order for it to be cleared. In other embodiments, the malfunction indicator 37 may deactivate once the condition that cause its activation clears.

Previous vehicle monitoring systems that monitor engine coolant temperature sensors in motor vehicles compare the actual engine coolant temperature with an expected engine coolant temperature for a given amount of fuel used. These systems estimate an expected engine coolant temperature based on the known amount of energy input into the engine, which can be derived from the amount of fuel used since the engine was started. If the actual engine coolant temperature is substantially different from the expected engine coolant temperature based on the amount of fuel used, the monitoring system may assume that the engine coolant temperature sensor has failed and generate an error signal.

However, previous monitoring systems were designed for motor vehicles using only gasoline as a fuel source. Motor vehicles now use a variety of fuel sources in addition to gasoline. Since different fuels release different amounts of energy, it may be difficult to estimate the amount of energy input into an engine that uses mixed fuels.

A motor vehicle system can include provisions for detecting malfunctions of an engine coolant water temperature sensor. In some embodiments, a motor vehicle system can calculate an expected engine coolant temperature using information from various sensors that do not include an engine coolant water temperature sensor. The term "vehicle system," as used throughout the specification and claims, refers to any system that analyzes, operates, monitors and/or controls at least one vehicle parameter. For example, one vehicle system may include an engine cooling system. Other examples of vehicle systems include, but are not limited to, fuel systems, oil systems, lubrication systems, exhaust systems, engine systems, on-board diagnostic system, as well as other monitoring systems.

Figure 2:
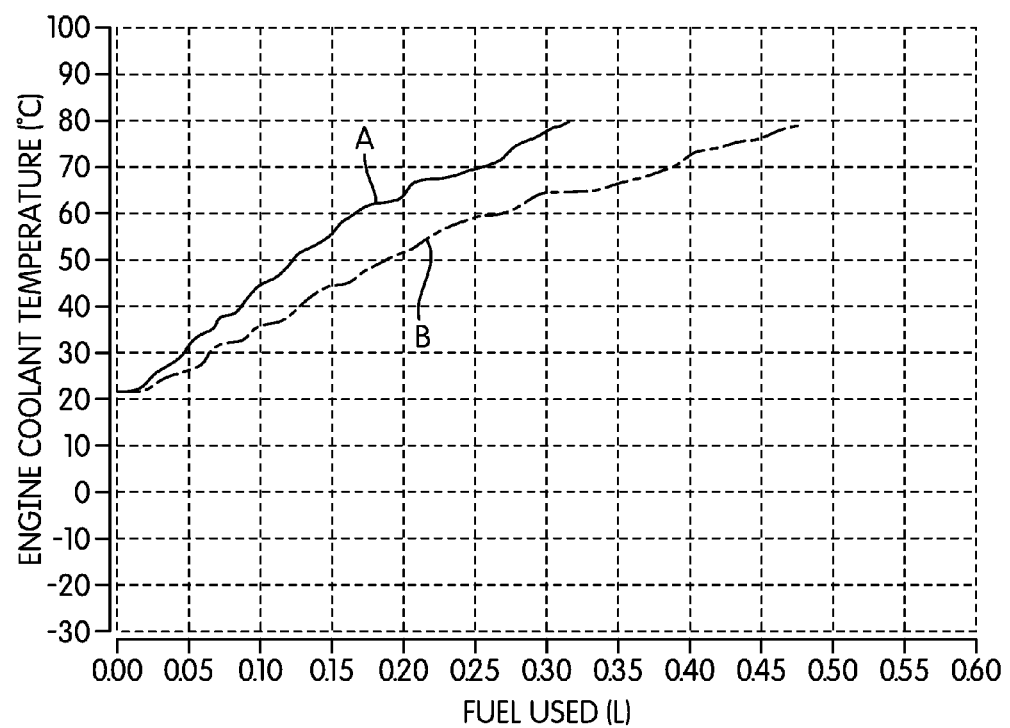
FIG. 2 is a sample relationship of engine coolant water temperature versus fuel for both gasoline and ethanol fuels.

In one embodiment, the expected engine coolant temperature may be calculated based on the amount of fuel used. FIG. 2 illustrates how the relationship between the engine coolant temperature and the amount of fuel used may vary with different types of fuel. Relationship A shows the increase in engine coolant temperature when the motor vehicle uses gasoline as fuel. Relationship B shows the increase in engine coolant temperature when the motor vehicle uses ethanol as fuel. As can be seen in FIG. 2, the engine coolant temperature of a motor vehicle using gasoline as fuel increases more quickly than if the vehicle was using ethanol as fuel. Since many vehicles cannot determine the type of fuel the vehicle is using, estimating an expected engine coolant temperature for a motor vehicle using mixed fuels can be difficult.

Therefore, in order to correctly estimate the engine coolant temperature, motor vehicle systems may consider the accumulated engine mass air flow that has passed through the engine. The relationship between the engine coolant temperature and the accumulated engine mass air flow does not vary based on the type of fuel.

The term "accumulated engine mass air flow" or "accumulated air flow" as used throughout this detailed description and in the claims applies to the total amount of air that has been delivered to the engine during a given time period. In some embodiments, the accumulated engine mass air flow is measured from the time the engine is started until some later time.

Figure 3:
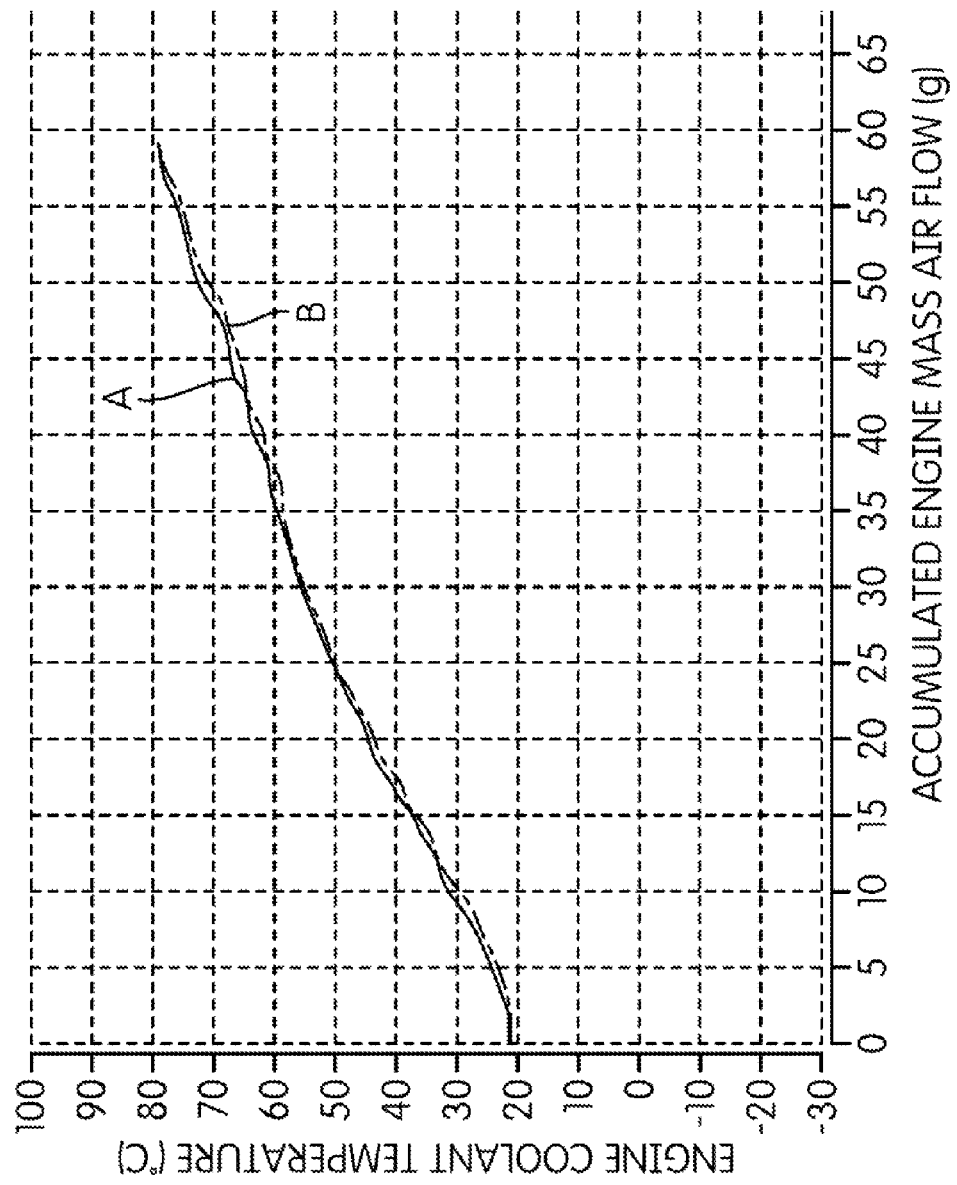
FIG. 3 is a sample relationship of engine coolant water temperature versus accumulated engine mass air flow for both gasoline and ethanol fuels.

In one embodiment, the expected engine coolant temperature can be calculated or estimated based on the accumulated engine mass air flow. FIG. 3 illustrates how the relationship between the engine coolant temperature and the accumulated engine mass air flow may not vary based on the type of fuel. The graph in FIG. 3 shows engine coolant temperature Tw (° C.) versus the accumulated engine mass air flow (grams) for the same motor vehicle shown in FIG. 2. Relationship A shows the increase in engine coolant temperature when the motor vehicle uses gasoline as fuel. Relationship B shows the increase in engine coolant temperature when the motor vehicle uses ethanol as fuel. As can be seen in FIG. 3, the rise in engine coolant temperature when using gasoline is approximately the same as when the vehicle is using ethanol. Therefore, engine monitoring systems may estimate the engine coolant temperature based on the accumulated engine mass air flow regardless of the type of fuel being used.

Figure 4:
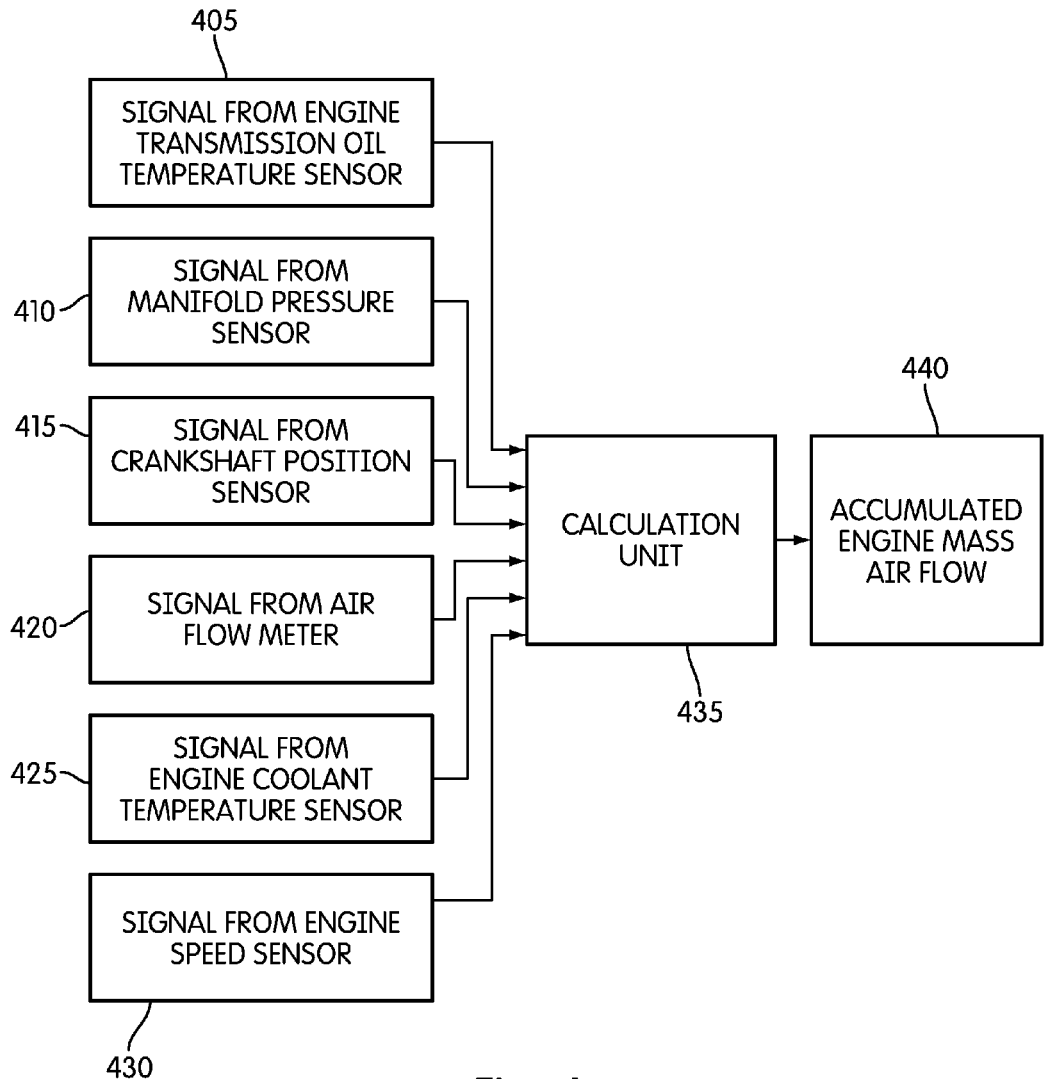
FIG. 4 is an embodiment of a calculation unit for determining accumulated engine mass air flow.

FIG. 4 illustrates the relationships between various sensors and electronic calculation systems used to determine accumulated engine mass air flow. FIG. 4 shows a calculation unit 435 which may be a microprocessor or other computing means. In some embodiments, the calculation unit 435 is the on-board diagnostic system. In some embodiments, the calculation unit 435 may be the electronic control unit. In some embodiments, the calculation unit 435 may be wholly or partially located in the electronic control unit and/or the on-board diagnostic system. In some embodiments, the calculation unit 435 may be independent from the electronic control unit and/or the on-board diagnostic system.

As can be seen in FIG. 4, the calculation unit 435 may receive a signal 405 from an engine oil transmission sensor. Although only one signal 405 from an engine transmission oil temperature sensor is shown in FIG. 4, more than one signal from one or more engine transmission oil temperature sensors may be sent to calculation unit 435.

In some embodiments, the calculation unit 435 may receive a signal 410 from a manifold pressure sensor. Although only one signal 410 from a manifold pressure sensor is shown in FIG. 4, more than one signal from one or more manifold pressure sensors may be sent to calculation unit 435.

In some embodiments, the calculation unit 435 may receive a signal 415 from a crankshaft position sensor. Although only one signal 415 from a crankshaft position sensor is shown in FIG. 4, more than one signal from one or more crankshaft position sensors may be sent to calculation unit 435.

In some embodiments, the calculation unit 435 may receive a signal 420 from an air flow meter. Although only one signal 420 from an air flow meter is shown in FIG. 4, more than one signal from one or more airflow meters may be sent to calculation unit 435.

In some embodiments, the calculation unit 435 may receive a signal 425 from an engine coolant temperature sensor. Although only one signal 425 from an engine coolant temperature sensor is shown in FIG. 4, more than one signal from one or more engine coolant temperature sensors may be sent to calculation unit 435.

In some embodiments, the calculation unit 435 may receive a signal 430 from an engine speed sensor. Although only one signal 430 from an engine speed sensor is shown in FIG. 4, more than one signal from one or more engine speed sensors may be sent to calculation unit 435.

In some embodiments, the calculation unit 435, or the electronic control unit, may use one or more of the signals shown in FIG. 4 to calculate the accumulated engine mass air flow 440. In some embodiments, signals not shown in FIG. 4 may be used to calculate the engine mass air flow 440. In some embodiments, the signals may be used to retrieve values stored in electronic memory relating to the accumulated engine mass air flow 440. In some embodiments, the values may be stored in calculation unit 435. In some embodiments, the electronic memory may be located in the electronic control unit. In other embodiments, the electronic memory may be partially located within the electronic control unit, or may be located outside the electronic control unit. In some embodiments, the signals may be used to calculate the actual or estimated accumulated engine mass air flow 440 based on methods known to those skilled in the art.

Figure 5:
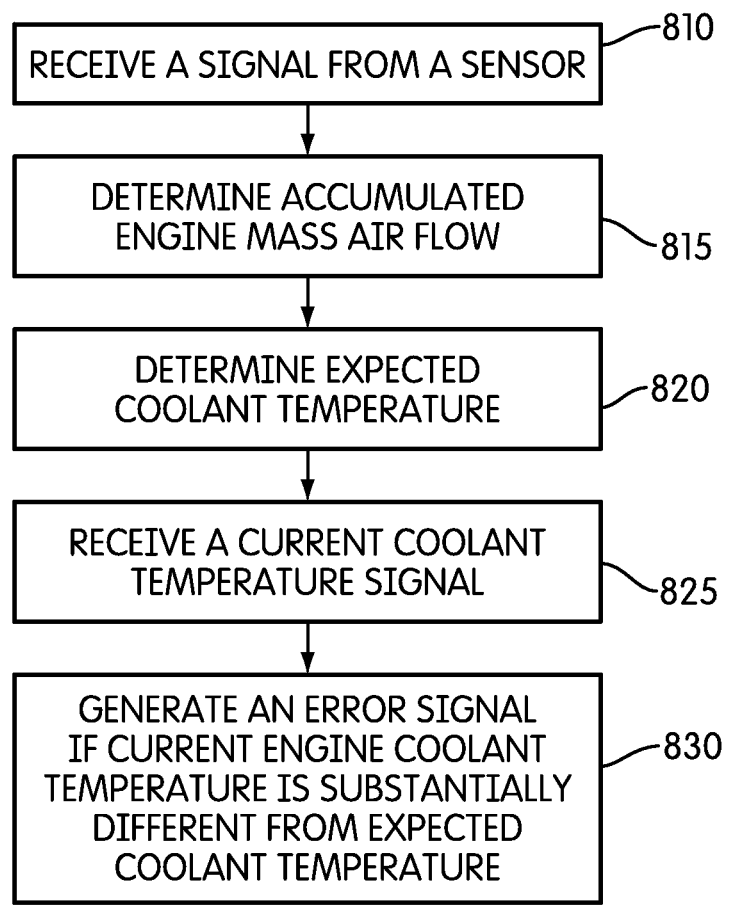
FIG. 5 is an embodiment of a method for considering accumulated mass air flow when determining whether to generate an engine coolant temperature error signal.

FIG. 5 is one embodiment of a method for monitoring an engine coolant temperature sensor by determining the accumulated engine mass air flow. In this embodiment, the following steps may be performed by the electronic control unit. However, in some embodiments these steps may be performed by additional systems or devices associated with the electronic control unit and/or motor vehicle. For example, some of the following steps may be performed by the calculation unit 435 as shown in FIG. 4. In addition, it will be understood that in other embodiments one or more of the following steps may be optional.

In step 810, the calculation unit 435, or the electronic control unit, may receive information from a sensor. In some embodiments, the calculation unit 435, or electronic control unit, may receive one or more electronic signal(s) from an air flow meter 420. In some embodiments, the calculation unit 435, or electronic control unit, may receive one or more electronic signal(s) from any of the sensors shown in FIGS. 1 and/or 4. The calculation unit 435, or electronic control unit, may also receive one or more electronic signal(s) from sensors not shown in FIG. 1 or 4, but which are known by those skilled in the art.

In step 815, the calculation unit 435, or electronic control unit, may determine the accumulated engine mass air flow based on the signal(s) received in step 810. In some embodiments, the calculation unit 435, or electronic control unit, may calculate the accumulated engine mass air flow to include the amount of air that has passed through the engine starting from substantially the same point in time as starting the engine. In some embodiments, the calculation unit 435, or electronic control unit, may calculate the accumulated engine mass air flow to include the amount of air that has passed through the engine starting from some point in time after starting the engine.

In step 820, the calculation unit 435, or electronic control unit, may determine the expected engine coolant temperature that corresponds to the accumulated engine mass air flow that was determined in step 815. In some embodiments, the expected engine coolant temperature for a corresponding accumulated engine mass air flow is stored in electronic memory. In some embodiments, a graph or chart of expected engine coolant temperature versus accumulated engine mass air flow, such as that shown in FIG. 3, is stored in electronic memory. In other embodiments, the data shown in FIG. 3 may be stored in electronic memory in a table. In still other embodiments, the data may be stored electronically in any format known to those skilled in the art. In still other embodiments, the calculation unit 435, or electronic control unit, may use any of the signals shown in FIG. 4 to calculate the expected engine coolant temperature using equations that are known to those skilled in the art.

In step 825, the calculation unit 435, or electronic control unit, may receive a current coolant temperature signal. In some embodiments, the calculation unit 435, or electronic control unit, may receive an electronic signal from an engine coolant temperature signal 425, as shown in FIG. 4. In some embodiments, the calculation unit 435, or electronic control unit, may receive an electronic signal from any of the sensors shown in FIGS. 1 and/or 4 in order to derive the engine coolant temperature. The calculation unit 435, or electronic control unit, may also receive an electronic signal from sensors not shown in FIG. 1 or 4, but which are known by those skilled in the art, in order to derive the engine coolant temperature.

In step 830, the calculation unit 435, or electronic control unit, may compare the current engine coolant temperature with the expected engine coolant temperature. If the current engine coolant temperature is substantially similar to the expected engine coolant temperature, then the engine coolant temperature sensor is operating properly and no error signal is generated. If the current engine coolant temperature is substantially different from the expected engine coolant temperature, then the engine coolant temperature sensor is not operating properly and an error signal is generated.

In some embodiments, an error signal may be generated if the current engine coolant temperature is substantially greater than the expected engine coolant temperature. In some embodiments, an error signal may be generated if the current engine coolant temperature is above the expected engine coolant temperature by a predetermined amount. For example, in some embodiments, an error signal may be generated if the current engine coolant temperature is 1° C. above the expected engine coolant temperature. However, in some embodiments, the predetermined threshold amount above which an error signal may be generated may be more or less than 1° C. above the expected engine coolant temperature. For example, in some embodiments, an error signal may be generated if the current engine coolant temperature is 5° C. above the expected engine coolant temperature. In some embodiments, an error signal is generated if the current engine coolant temperature is more than 5° C. above the expected engine coolant temperature.

In some embodiments, an error signal may be generated if the current coolant temperature is substantially less than the expected engine coolant temperature. In some embodiments, an error signal may be generated if the current engine coolant temperature below the expected engine coolant temperature by a predetermined amount. For example, in some embodiments, an error signal may be generated if the current engine coolant temperature is 1° C. below the expected engine coolant temperature. However, in some embodiments, the predetermined amount by which the current engine coolant temperature must be below the expected engine coolant temperature in order to trigger generation of an error signal may be more or less than 1° C. For example, in some embodiments, an error signal may be generated if the current engine coolant temperature is 5° C. below the expected engine coolant temperature. In other embodiments, an error signal may be generated if the current engine coolant temperature is more than 5° C. below the expected engine coolant temperature.

In some embodiments, the error signal may activate a malfunction indicator. In some embodiments, the error signal may be stored in electronic memory and/or not displayed to the driver. In some embodiments, an error signal will cause the engine coolant temperature sensor to be ignored, or discarded, and is not used in calculations that require the engine coolant temperature as an input. In some embodiments, the expected engine coolant temperature may be used in place of the actual engine coolant temperature if it is determined that the engine coolant temperature sensor is not working properly.

In some embodiments, the engine coolant temperature sensor may not be monitored for a possible failure condition until certain conditions are satisfied. For example, in some embodiments, the engine coolant temperature may increase by a predetermined amount after the engine has started before the engine coolant temperature sensor is tested for a failure condition. In some embodiments, the accumulated air flow may reach a predetermined value before the engine coolant temperature sensor is tested for a failure condition. In some embodiments, the engine coolant temperature may increase by a predetermined amount and the accumulated air flow may reach a predetermined value before the engine coolant temperature sensor is tested for a failure condition. This allows the engine time to warm up and reach normal operating conditions before the engine coolant temperature sensor is tested for a possible failure condition. Allowing the engine time to warm up reduces the likelihood that the engine coolant temperature sensor will be prematurely tested for a failure condition, which may result in a false error signal. For example, if the engine is started in very cold conditions, a vehicle system may determine that the actual engine coolant temperature is substantially below the expected engine coolant temperature, which is associated with an engine that is at normal operating temperatures, resulting in a false error signal. By allowing the engine time to warm up before testing the engine coolant temperature sensor, the number of these false error signals may be reduced.

Figure 6:
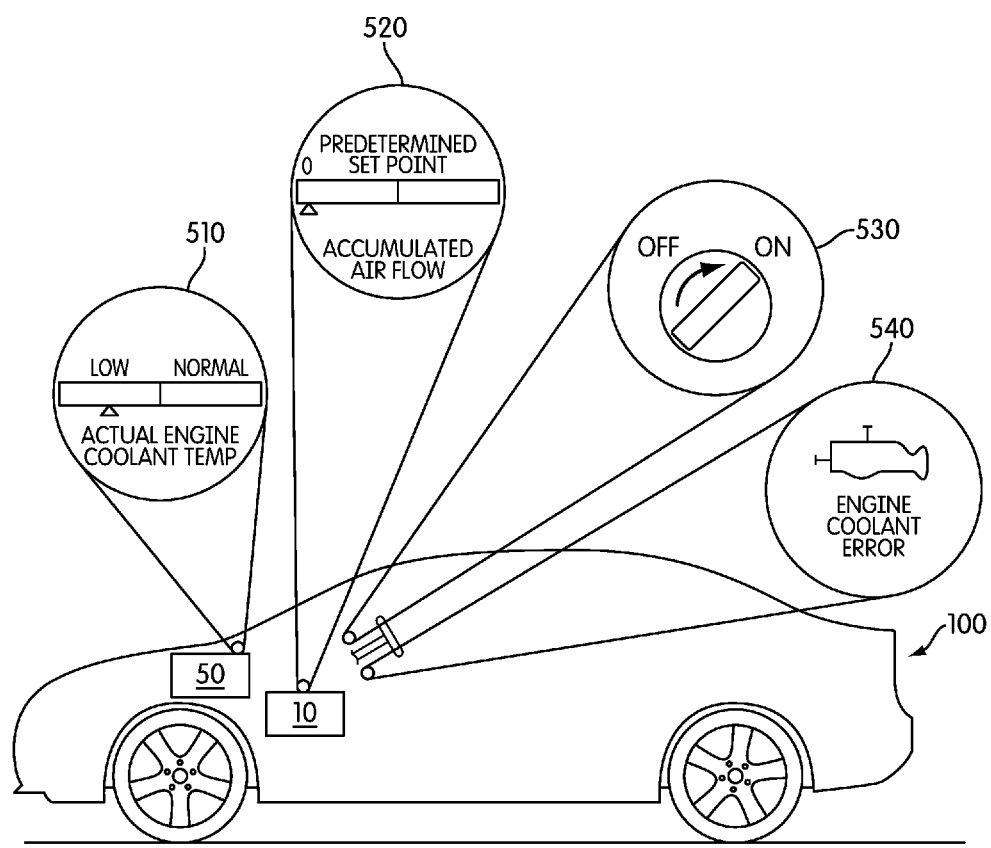
FIG. 6 is a schematic view of an embodiment of a vehicle during start up.
Figure 7:
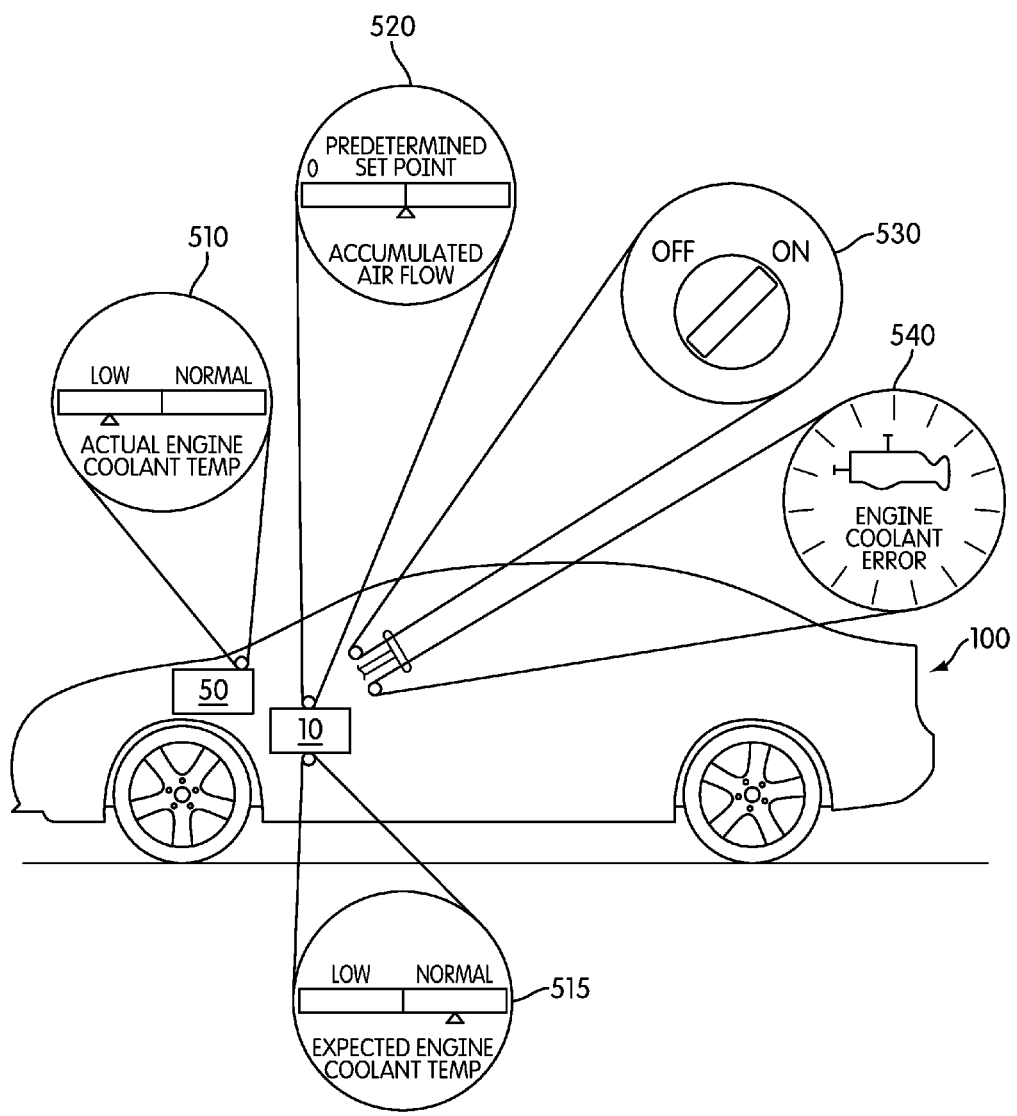
FIG. 7 is a schematic view of an embodiment of a vehicle that considers accumulated engine mass air flow when determining whether to activate a malfunction indicator.
Figure 8:
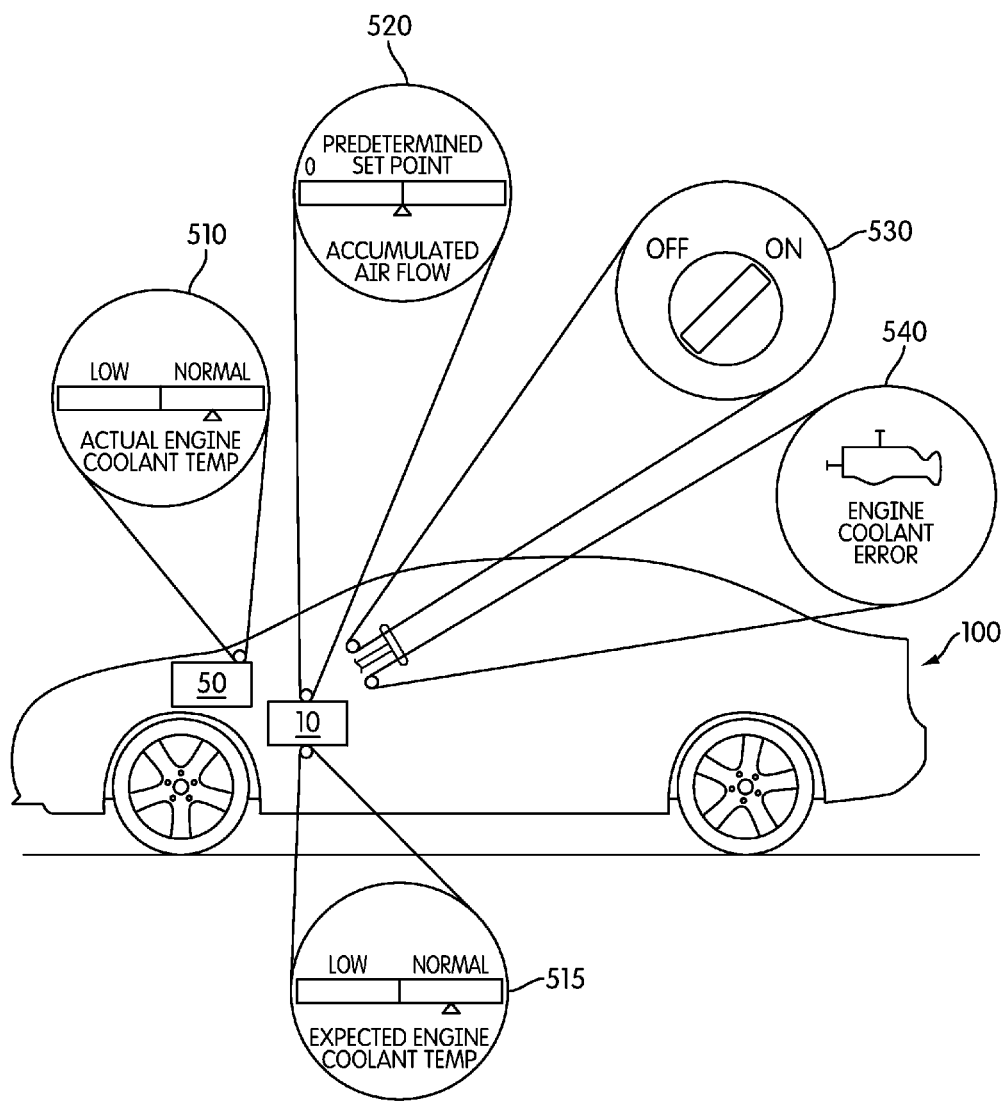
FIG. 8 is a schematic view of an embodiment of a vehicle that considers accumulated engine mass air flow when determining whether to activate a malfunction indicator.

FIGS. 6-8 illustrate an embodiment of vehicle 100 that operates on mixed fuels and considers accumulated engine mass air flow when monitoring the engine coolant temperature sensor. In this embodiment, the accumulated engine mass air flow may reach a predetermined level before the engine coolant temperature sensor is tested for a failure condition. As can be seen in FIG. 6, the ignition switch may be placed in the on position 530 causing the engine to start. The electronic control unit 10 may begin tracking the accumulated engine mass air flow 520. The engine coolant temperature 510 may be low because the vehicle has recently been started. Since the accumulated engine mass air flow 520 has not reached a predetermined level, the engine coolant temperature sensor may not be tested at this time for a failure condition. Since the engine has not yet reached normal operating conditions, the engine coolant temperature sensor is not tested and the malfunction indicator is not activated 540.

FIG. 7 shows an embodiment of vehicle 100 at some time after the time illustrated in FIG. 6. The ignition switch is in the on position 530 and the engine 50 has been operating for some time. The electronic control unit 10 has determined that the accumulated engine mass air flow 520 has reached a predetermined set point. Since the accumulated engine mass air flow 520 has reached a predetermined set point, the engine coolant temperature sensor is tested for a failure condition. FIG. 7 shows that the actual engine coolant temperature 510 is substantially below the expected engine coolant temperature 515 corresponding to the accumulated engine mass air flow 520. Therefore, the electronic control unit 10 generates a signal activating the malfunction indicator 540 located on the dashboard. The malfunction indicator 540 informs the driver that the engine coolant temperature sensor has failed so that action can be taken to repair the sensor.

FIG. 8 shows another embodiment of vehicle 100 in which the engine coolant temperature sensor is working properly. The vehicle 100 shown in FIG. 8 has the ignition switch 530 in the on position and the engine 50 has been operating for some time. The electronic control unit 10 has determined that the accumulated engine mass air flow 520 has reached a predetermined set point. Since a predetermined set point has been reached, the engine coolant temperature sensor is tested for a failure condition. FIG. 8 shows that the actual engine coolant temperature 510 is substantially similar to the expected engine coolant temperature 515 corresponding to the accumulated engine mass air flow 520. Therefore, the electronic control unit 10 does not generate a signal activating the malfunction indicator 540.

In some embodiments, the specific conditions that trigger testing of the engine coolant temperature sensor may vary. In some embodiments, the engine coolant temperature sensor may be tested once a predetermined amount of air has passed through the engine. For example an accumulated engine mass air flow of 100 grams may trigger testing of the engine coolant temperature sensor. In some embodiments, an accumulated engine mass air flow of less than 100 grams may trigger testing of the engine coolant temperature sensor. For example, in some embodiments, an accumulated engine mass air flow of 80 grams may trigger testing of the engine coolant temperature sensor. In other embodiments an accumulated engine mass air flow of greater than 100 grams may trigger testing. For example, in some embodiments, an accumulated engine mass air flow of 120 grams may trigger testing of the engine coolant temperature sensor. Waiting to test the engine coolant temperature sensor until the accumulated engine mass air flow reaches a predetermined set point allows the engine to warm-up from a cold condition and allows the engine to absorb energy from the fuel. This reduces the chances of testing an engine coolant temperature sensor when the engine has not warmed up to normal operating conditions, which may result in erroneously activating the malfunction indicator. This may occur, for example, in cold weather, or other extreme environmental condition.

In some embodiments, testing of the engine coolant temperature sensor may be triggered by a predetermined change in the engine coolant temperature. For example, in some embodiments, testing of the engine coolant temperature sensor may be triggered by a change of 10° C. in the engine coolant temperature. In some embodiments, testing of the engine coolant temperature sensor may be triggered by a change of less than 10° C. For example, in some embodiments, testing of the engine coolant temperature sensor may be triggered by a change of 8° C. In other embodiments, testing of the engine coolant temperature sensor may be triggered by a change of greater than 10° C. For example, in some embodiments, testing of the engine coolant temperature sensor may be triggered by a change of 12° C. Waiting to test the engine coolant temperature sensor until the change in engine coolant temperature reaches a predetermined change allows the engine to warm-up from a cold condition and allows the engine to absorb energy from the fuel. This reduces the chances of testing an engine coolant temperature sensor before the engine has warmed up to normal operating conditions, which may result in erroneously activating the malfunction indicator. This may occur, for example, in cold weather, or other extreme environmental condition.

Although some of the steps of the embodiment shown in FIGS. 6-8 were performed by the electronic control unit, some of the steps may be performed by additional systems or devices associated with the electronic control unit and/or motor vehicle. In some embodiments, some of the steps may be performed by the calculation unit 435 shown in FIG. 4. In some embodiments, some of the steps may be performed by the on-board diagnostic system. In some embodiments, some of the steps may be performed by the electronic control unit and/or the on-board diagnostic system and/or the calculation unit 435.

Figure 9:
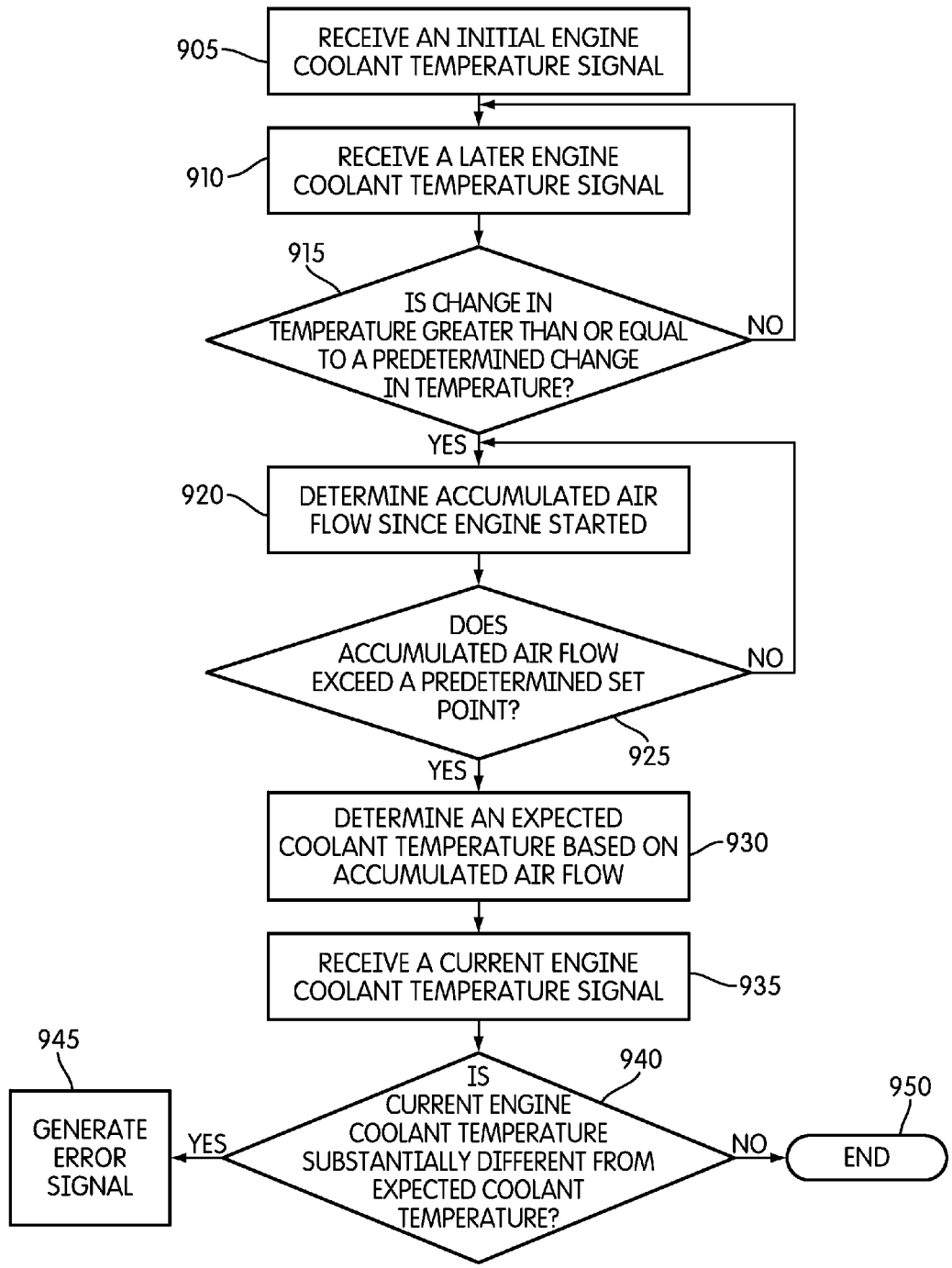
FIG. 9 is another embodiment of a method for considering accumulated mass air flow when determining whether to generate an engine coolant temperature error signal.

FIG. 9 is an embodiment of a method for monitoring an engine coolant temperature sensor upon the occurrence of predetermined conditions. In this embodiment, the following steps may be performed by the electronic control unit. However in some embodiments these steps may be performed by additional systems or devices associated with the electronic control unit and/or motor vehicle. For example, some of the following steps may be performed by the calculation unit 435 as shown in FIG. 4. In addition, it will be understood that in other embodiments one or more of the following steps may be optional.

In step 905, the calculating unit 435, or the electronic control unit, may receive information from a sensor. In some embodiments, the calculation unit 435, or electronic control unit, may receive an electronic signal 425 representing an initial engine coolant temperature from an engine coolant temperature sensor. In some embodiments, the calculation unit 435, or electronic control unit, may receive an electronic signal from any of the sensors shown in FIG. 1, including, for example, any of the sensor signals shown in FIG. 4, and then derive the engine coolant temperature. The calculation unit 435, or electronic control unit, may also receive an electronic signal not shown in FIG. 4, for example from one or more sensors not shown in FIG. 1, and then derive the engine coolant temperature.

In step 910, the calculating unit 435, or the electronic control unit, may receive further information from a sensor. In some embodiments, the calculation unit 435, or electronic control unit, may receive an electronic signal 425 representing a later engine coolant temperature from an engine coolant temperature sensor. In some embodiments, the calculation unit 435, or electronic control unit, may receive an electronic signal from any of the sensors shown in FIG. 1, including, for example, any of the sensor signals shown in FIG. 4, and then derive the engine coolant temperature. The calculation unit 435, or electronic control unit, may also receive an electronic signal not shown in FIG. 4, for example from one or more sensors not shown in FIG. 1, and then derive the engine coolant temperature.

In step 915, the calculating unit 435, or the electronic control unit, determines the difference between the initial engine coolant temperature and the later engine coolant temperature. The difference is then compared with a predetermined change in temperature. In some embodiments, the predetermined change in temperature is stored in electronic memory. In some embodiments, the predetermined change in temperature is calculated based on various operational and/or environmental parameters. In some embodiments, the predetermined change in temperature may vary according to various parameters including, but not limited to, ambient temperature, recent driving conditions, recent engine operations, and/or recent engine speeds. If the change in temperature is less than the predetermined change in temperature, then the electronic control unit, or calculation unit 435, may repeat step 910. If the change in temperature is equal to or greater than the predetermined change in temperature, then the electronic control unit, or calculation unit 435, may proceed to step 920.

In step 920, the calculation unit 435, or electronic control unit, may determine the accumulated engine mass air flow. In some embodiments, the accumulated engine mass air flow may be determined based on one or more electronic signal(s) from an air flow meter 420, as shown in FIG. 4. In some embodiments, the calculation unit 435, or electronic control unit, may calculate the accumulated engine mass air flow to include the amount of air that has passed through the engine starting from the point in time when the ignition switch was placed in the on position. In some embodiments, the calculation unit 435, or electronic control unit, may calculate the accumulated engine mass air flow to include the amount of air that has passed through the engine starting from some point in time after the ignition switch is placed in the on position.

In some embodiments, the calculation unit 435, or electronic control unit, may receive one or more electronic signal(s) from an air flow meter 420. In some embodiments, the calculation unit 435, or electronic control unit, may receive one or more electronic signal(s) from any of the sensors shown in FIGS. 1 and/or 4 in order to determine or estimate accumulated engine mass air flow. The calculation unit 435, or electronic control unit, may also utilize electronic signals from sensors not shown in FIG. 1 or 4, but which are known by those skilled in the art, in order to determine or estimate accumulated engine mass air flow.

In step 925, the calculation unit 435, or electronic control unit, may determine whether or not the accumulated engine mass air flow is equal to or greater than a predetermined set point. For example, in some embodiments the predetermined set point may be 100 grams. In some embodiments, the predetermined set point may be less than 100 grams. For example, in some embodiments, the predetermined set point may be 80 grams. In other embodiments the predetermined set point may be greater than 100 grams. For example, in some embodiments, the predetermined set point may be 120 grams. In some embodiments, if the accumulated engine mass air flow is less than the predetermined set point, then the electronic control unit, or calculation unit 435, repeats step 920. In some embodiments, if the accumulated engine mass air flow is greater than or equal to the predetermined set point, then the electronic control unit, or calculation unit 435, may proceed to step 930.

In step 930, the calculation unit 435, or electronic control unit, may determine the expected engine coolant temperature that corresponds to the accumulated engine mass air flow that was determined in step 920. In some embodiments, the expected engine coolant temperature for a corresponding accumulated engine mass air flow may be stored in electronic memory. In some embodiments, a graph or chart of expected engine coolant temperature versus accumulated engine mass air flow, such as that shown in FIG. 3, may be stored in electronic memory. In other embodiments, the data shown in FIG. 3 may be stored in electronic memory in a table. In still other embodiments, the data may be stored electronically in any format known to those skilled in the art. In still further embodiments, the calculation unit 435, or electronic control unit, may use any of the signals shown in FIG. 4 to calculate the expected engine coolant temperature using equations that are known to those skilled in the art.

In step 935, the calculation unit 435, or electronic control unit, may receive information from a sensor relating to a current coolant temperature. In some embodiments, the calculation unit 435, or electronic control unit, may receive an electronic signal 425 from an engine coolant temperature sensor, as shown in FIG. 4. In some embodiments, the calculation unit 435, or electronic control unit, may receive an electronic signal from any of the sensors shown in FIG. 1, including, for example, any of the sensor signals shown in FIG. 4, in order to derive the engine coolant temperature. The calculation unit 435, or electronic control unit, may also receive an electronic signal not shown in FIG. 4, for example from one or more sensors not shown in FIG. 1, but which are known by those skilled in the art, in order to derive the engine coolant temperature.

In step 940, the calculation unit 435, or electronic control unit, may compare the current engine coolant temperature with the expected engine coolant temperature. If the current engine coolant temperature is substantially similar to the expected engine coolant temperature, then the engine coolant temperature sensor is operating properly and no error signal is generated, as shown in step 950. If the current engine coolant temperature is substantially different from the expected engine coolant temperature, then the engine coolant temperature sensor is not operating properly and an error signal is generated, as shown in step 945.

In some embodiments, an error signal may be generated if the current engine coolant temperature is substantially greater than the expected engine coolant temperature. In some embodiments, an error signal may be generated if the current engine coolant temperatures is a predetermined amount above the expected engine coolant temperature. For example, in some embodiments, an error signal may be generated if the current engine coolant temperature is 1° C. above the expected engine coolant temperature. In some embodiments, an error signal may be generated if the current engine coolant temperature is more or less than 1° C. above the expected engine coolant temperature. For example, in some embodiments, an error signal may be generated if the current engine coolant temperature is 5° C. above the expected engine coolant temperature. In some embodiments, an error signal is generated if the current engine coolant temperature is more than 5° C. above the expected engine coolant temperature.

In some embodiments, an error signal may be generated if the current coolant temperature is substantially less than the expected engine coolant temperature. For example, in some embodiments, an error signal may be generated if the current engine coolant temperature below the expected engine coolant temperature by a predetermined amount, such as 1° C. However, in some embodiments, an error signal may be generated if the current engine coolant temperature is more or less than 1° C. below the expected engine coolant temperature. For example, in some embodiments, an error signal may be generated if the current engine coolant temperature is 5° C. below the expected engine coolant temperature. In other embodiments, an error signal may be generated if the current engine coolant temperature is more than 5° C. below the expected engine coolant temperature.

In some embodiments, the error signal may activate a malfunction indicator. In some embodiments, the error signal may be stored in electronic memory and/or not displayed to the driver. In some embodiments, an error signal may cause the engine coolant temperature sensor to be ignored or discarded in any calculation that requires the engine coolant temperature as an input.

Figure 10:
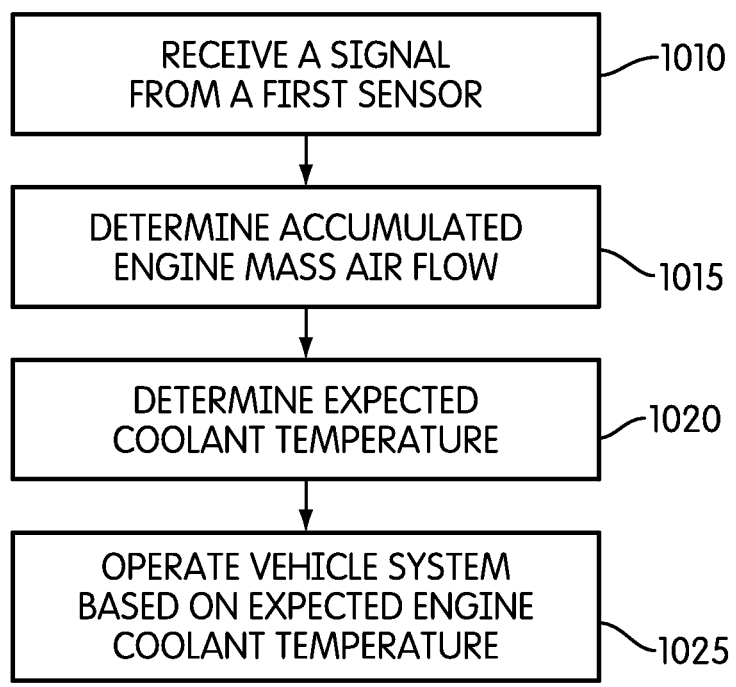
FIG. 10 is an embodiment of a method for considering accumulated mass air flow when operating vehicle systems based on expected engine coolant temperature.

In some embodiments, the expected engine coolant temperature may be used for any purpose. For example, in some embodiments, the expected engine coolant temperature may be used to operate other vehicle systems whenever the engine coolant temperature sensor is not working properly. FIG. 10 illustrates one embodiment of a method in which the expected engine coolant temperature could be used to operate other vehicle systems.

In step 1010, the calculation unit 435, or the electronic control unit, may receive information from a sensor. In some embodiments, the calculation unit 435, or electronic control unit, may receive one or more electronic signal(s) from an air flow meter 420. In some embodiments, the calculation unit 435, or electronic control unit, may receive one or more electronic signal(s) from any of the sensors shown in FIGS. 1 and/or 4. The calculation unit 435, or electronic control unit, may also receive one or more electronic signal(s) from sensors not shown in FIG. 1 or 4, but which are known by those skilled in the art.

In step 1015, the calculation unit 435, or electronic control unit, may determine the accumulated engine mass air flow based on the signal(s) received in step 1010. In some embodiments, the calculation unit 435, or electronic control unit, may calculate the accumulated engine mass air flow to include the amount of air that has passed through the engine starting from substantially the same point in time as starting the engine. In some embodiments, the calculation unit 435, or electronic control unit, may calculate the accumulated engine mass air flow to include the amount of air that has passed through the engine starting from some point in time after starting the engine.

In step 1020, the calculation unit 435, or electronic control unit, may determine the expected engine coolant temperature that corresponds to the accumulated engine mass air flow that was determined in step 1015. In some embodiments, the expected engine coolant temperature for a corresponding accumulated engine mass air flow is stored in electronic memory. In some embodiments, a graph or chart of expected engine coolant temperature versus accumulated engine mass air flow, such as that shown in FIG. 3, is stored in electronic memory. In other embodiments, the data shown in FIG. 3 may be stored in electronic memory in a table. In still other embodiments, the data may be stored electronically in any format known to those skilled in the art. In still other embodiments, the calculation unit 435, or electronic control unit, may use any of the signals shown in FIG. 4 to calculate the expected engine coolant temperature using equations that are known to those skilled in the art.

In step 1025, the calculation unit 435, or electronic control unit, may operate a vehicle system based on the value of the expected engine coolant temperature. In one embodiment, the expected engine coolant temperature may be substituted for a signal from the engine coolant temperature sensor. In other words, the expected engine coolant temperature may be used, instead of the signal from the engine coolant temperature sensor, in calculations relating to monitoring, analyzing, operating, or controlling any vehicle system. In one embodiment, if the engine coolant temperature sensor has failed, the expected engine coolant temperature may be used when determining an average engine coolant temperature. In another embodiment, the expected engine coolant temperature may be used as an input to the on-board diagnostic system for determining if the engine coolant temperature exceeds a high temperature set point whenever the engine coolant temperature sensor has failed. In other embodiments, the expected engine coolant temperature may be used with any other vehicle system that uses actual engine coolant temperature as an input.

In describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied.

While various embodiments have been described, the description is intended to be exemplary, rather than limiting and it will be apparent to those of ordinary skill in the art that many more embodiments and implementations are possible. Also, various modifications and changes may be made within the scope of the attached claims.

What is claimed is:

1. A method of monitoring an engine coolant temperature sensor of a motor vehicle, the method comprising:
receiving one or more sensor signals, at an electronic control unit associated with the motor vehicle, from at least one sensor associated with an engine utilizing mixed fuels;
determining, by the electronic control unit, an accumulated engine mass air flow from the one or more sensor signals;
determining, by the electronic control unit, an expected engine coolant temperature value based on the accumulated mass air flow, using a relationship consisting essentially of a predetermined direct correlation between accumulated engine mass air flow and engine coolant temperature independent of an air fuel ratio;
receiving a current engine coolant temperature sensor signal, at the electronic control unit, from an engine coolant temperature sensor;
determining, by the electronic control unit, a current engine coolant temperature value based on the current engine coolant temperature sensor signal; and
generating an error signal, by the electronic control unit, if the current engine coolant temperature value is different from the expected engine coolant temperature value by a predetermined amount.

2. The method of claim 1, wherein the at least one sensor is a mass air flow sensor.

3. The method of claim 1, wherein the at least one sensor is an engine speed sensor.

4. The method of claim 1, wherein the at least one sensor is a manifold pressure sensor.

5. The method of claim 1, wherein receiving one or more signals from at least one sensor includes receiving signals from two or more sensors selected from the group consisting essentially of a mass air flow sensor, an engine speed sensor, a manifold pressure sensor, and a crank pulse sensor.

6. The method of claim 1, wherein determining the expected engine coolant temperature value includes accessing a table of values stored in electronic memory and retrieving the expected engine coolant temperature value associated with the accumulated mass air flow.

7. The method of claim 6, wherein the expected engine coolant temperature value is determined if the accumulated engine mass air flow is equal to or greater than a predetermined set point.

8. A method of monitoring an engine coolant temperature sensor of a motor vehicle, the method comprising:

receiving a signal from a sensor associated with an engine utilizing mixed fuels, at an electronic control unit associated with the motor vehicle;

determining, by the electronic control unit, an accumulated engine mass air flow from the sensor signal;

determining, by the electronic control unit, an expected engine coolant temperature value based on the accumulated engine mass air flow using a relationship consisting essentially of a predetermined direct correlation between accumulated engine mass air flow and engine coolant temperature independent of an air fuel ratio; and operating at least one vehicle system based on the expected engine coolant temperature value.

9. The method of claim 8, further comprising:

receiving a current engine coolant temperature sensor signal from an engine coolant temperature sensor;

determining a current engine coolant temperature value based on the current engine coolant temperature sensor signal; and generating an error signal if the current engine coolant temperature value is lower than the expected engine coolant temperature value.

10. The method of claim 8, wherein the step of determining an accumulated engine mass air flow further comprising:

receiving an initial coolant temperature signal from the engine coolant temperature sensor at substantially the same time the engine is started;

receiving a later coolant temperature signal from the engine coolant temperature sensor some time after the engine has started; and determining an accumulated engine mass air flow if the difference between the initial coolant temperature signal and the later coolant temperature signal is equal to or greater than a predetermined amount.

11. The method of claim 8, wherein the sensor is a mass air flow sensor.

12. The method of claim 8, wherein the step of operating at least one vehicle system is performed if the accumulated engine mass air flow is greater than or equal to a predetermined accumulated engine mass air flow set point.

13. The method of claim 10, wherein the predetermined change in temperature is 10° C.

14. A system for monitoring a coolant temperature sensor of a motor vehicle, the system comprising: an engine that operates using mixed fuels;

an electronic control unit associated with the engine, wherein an electronic memory is associated with the electronic control unit;

a first sensor electronically connected to the electronic control unit, wherein the electronic control unit determines the accumulated engine mass air flow of the engine based on the signal sent by the first sensor, wherein the electronic control unit determines an expected engine coolant temperature based on the accumulated engine mass air flow using a relationship consisting essentially of a predetermined direct correlation between accumulated engine mass air flow and engine coolant temperature independent of an air fuel ratio; and an engine coolant temperature sensor electronically connected to the electronic control unit, wherein the electronic control unit receives a current engine coolant temperature signal from the engine coolant temperature sensor and determines a current engine coolant temperature based on the current engine coolant temperature sensor signal, wherein the electronic control unit compares the current engine coolant temperature to the expected engine coolant temperature, and wherein the electronic control unit generates an error signal if the engine coolant temperature is different from the expected engine coolant temperature by a predetermined amount.

15. The system of claim 14, wherein the first sensor is a mass air flow sensor.

16. The system of claim 14, wherein the electronic control unit compares the current engine coolant temperature to the expected engine coolant temperature if the accumulated engine mass air flow is greater than or equal to a predetermined set point.

17. The system of claim 16, wherein the predetermined set point is 100 grams.

18. The system of claim 14, wherein the electronic memory of the electronic control unit stores the expected engine coolant temperature.

19. The system of claim 14, further comprising:

a malfunction indicator electronically connected to the electronic control unit, wherein the error signal generated by the electronic control unit activates the malfunction indicator.

20. The system of claim 14, wherein the electronic control unit receives an initial coolant temperature signal from the engine coolant temperature sensor at substantially the same time the engine is started, wherein the electronic control unit receives a later coolant temperature signal from the engine coolant temperature sensor some time after the engine has started, wherein the electronic control unit determines an accumulated engine mass air flow if the difference between the initial coolant temperature signal and the later coolant temperature signal is greater than or equal to a predetermined amount.

* * * * *